United States Patent [19]

Taniguchi et al.

[11] Patent Number: 5,252,358

[45] Date of Patent: Oct. 12, 1993

[54] METHOD FOR SURFACE-TREATING THE INNER WALL OF A FURNACE, WHICH IS LINED WITH CERAMIC FIBERS

[75] Inventors: Satoshi Taniguchi, Ichinomiya; Koji Yamada, Handa, both of Japan

[73] Assignee: NGK Insulators, Ltd., Nagoya, Japan

[21] Appl. No.: 578,382

[22] Filed: Sep. 7, 1990

[30] Foreign Application Priority Data

Sep. 18, 1989 [JP] Japan .................................. 1-241510

[51] Int. Cl.$^5$ .............................................. B05D 7/22
[52] U.S. Cl. .................... 427/237; 427/255; 427/255.4; 427/343; 427/379
[58] Field of Search ...................... 427/237, 255, 255.4, 427/343, 379.2; 501/73, 35, 95, 128, 133, 154

[56] References Cited

U.S. PATENT DOCUMENTS

| | | | |
|---|---|---|---|
| 4,004,052 | 1/1977 | Bystrova | 427/376.2 |
| 4,047,965 | 9/1977 | Karst et al. | 501/128 |
| 4,324,602 | 4/1982 | Davis et al. | 156/275.5 |
| 4,381,716 | 5/1983 | Hastings et al. | 501/95 |
| 4,552,804 | 11/1985 | Payne | 427/397.7 |
| 4,726,870 | 2/1988 | McWilliams et al. | 156/314 |

OTHER PUBLICATIONS

Hlavac, J. *The Technology of Glass and Ceramics*, N.Y. Elsevier Scientific Publ. Co., 1983, pp. 409–413.

*Primary Examiner*—Janyce Bell
*Attorney, Agent, or Firm*—Shea & Gould

[57] ABSTRACT

A method for treating the surface of the inner wall of a furnace, said inner wall being lined with ceramic fibers, involves placing a source generating an alkali component in a furnace for firing a material into a product, in which at least the inner wall is lined with a ceramic fiber body, and heating the interior of the furnace to vaporize the alkali component, thereby impregnating the surface layer portion of the ceramic fiber body with the thus vaporized alkali component.

14 Claims, 2 Drawing Sheets

METHOD FOR SURFACE-TREATING THE INNER WALL OF A FURNACE, WHICH IS LINED WITH CERAMIC FIBERS

BACKGROUND OF THE INVENTION

1. Field of the Invention

The present invention relates to a method for treating the surface of a ceramic fiber body lined with the inner wall of a kiln or other industrial furnace.

2. Prior Art

Hitherto, kilns or furnaces lined with ceramic fibers for the purpose of improving fuel cost effectiveness have been put to practice as those for firing materials into products.

Such industrial furnaces lined with ceramic fibers, for instance, have their inner walls so constructed from boards or blocks comprising ceramic fibers that they are smaller in heat capacity and better in thermal insulating properties than those made of refractory bricks, thus enabling rapid firing and improving fuel cost-effectiveness.

However, a problem with such conventional industrial furnaces, at least the inner walls of which are lined with ceramic fibers, is that a number of minuscular debris of ca. 100 to 500 $\mu$m in length fly apart from the surfaces of the ceramic fiber bodies during thermal expansions or contractions of the ceramic fibers caused by repeated in-furnace temperature rises and drops, the in-furnace circulation of combustion gases caused by a burner and for other reasons. Such debris of ceramic fibers are likely to be deposited onto the surface of the material to be fired. In consequence, the resulting product deteriorates severely or, to put it another way, loses surface smoothness and fair appearance which are otherwise achievable by glaze, etc. Such deteriorations are often referred to as the fiber dirt in the art. Thus, it is strongly demanded to ensure to prevent the occurrence of the fiber dirt, when products desired to be entirely free from the fiber dirt, esp., sanitary wares and tableware are made by firing.

It is accordingly an object of this invention to meet such a demand by the provision of a method for treating the surface of the inner wall of a furnace, said inner wall being lined with ceramic fibers, which ensures to prevent the occurrence of minuscular debris from the surface of a ceramic fiber body, thereby avoiding the deterioration of the product and improving the performance of the furnace.

SUMMARY OF THE INVENTION

According to one aspect of this invention, the above object is attained by the provision of a method for treating the surface of the inner wall of a furnace in which at least the inner wall is lined with a ceramic fiber body, characterized in that a source generating an alkali component is placed in the furnace, and the interior of the furnace is then heated to vaporize the alkali component, thereby impregnating the surface layer portion of the ceramic fiber body with the thus vaporized alkali component.

According to another aspect of this invention, there is provided a method as defined in the first aspect of this invention, characterized in that said source generating an alkali component is glaze applied on the material to be fired.

BRIEF DESCRIPTION OF THE DRAWINGS

The present invention will now be explained specifically but not exclusively with reference to the accompanying drawings, in which.

DETAILED DESCRIPTION OF THE PREFERRED EMBODIMENT

Figure 1:
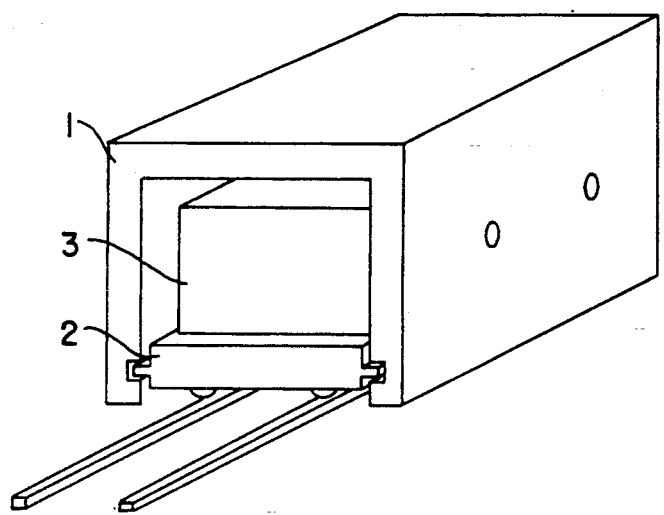
FIG. 1 is a perspective view of a kiln used in one embodiment of this invention.

In the present disclosure, the term "furnace" shall refer to a kiln or other type of industrial furnace available in the art.

Although not critical, each of the ceramic fibers, for instance, may be composed of 50% by weight of $Al_2O_3$, 35% by weight of $SiO_2$ and 15% by weight of $ZnO_2$.

An industrial furnace, in which at least the inner wall is lined with ceramic fibers, is constructed by a combination of fiber boards, fiber blocks and fiber blankets, all formed of ceramic fibers.

As the alkali component, it may be preferable to use a solution of a compound containing at least one of an alkaline metal such as K or Na or an alkaline earth metal such as Ca, Mg. Typical examples are KOH, KCl, $K_2SO_4$, $K_2CO_3$, NaOH, NaCl, $Na_2So_4$, $Na_2CO_3$, $Ca(OH)_2$, $CaSO_4$ and $CaCO_3$. Solutions of these compounds may be adjusted to a concentration of 0.1 to 10% by weight, if required, with the addition of a water-soluble binder.

The alkali component generating source may be a substance inclusive of an alkali salt, glaze, a rigidizer (a surface hardening material) or the like. For instance, these substances may be applied on the material to be fired. When the alkali component generating source is glaze, the material to be fired may be formed of any desired feed material. This invention is effectively applicable to products on which glaze for sanitary wares and tableware are put. This is because such tableware or sanitary wares are usually produced by applying glaze on the surface of the material to be fired, during which the alkali component contained in it is vaporized and the surfaces of ceramic fibers are impregnated with the resulting vapor. Thus, the glaze does not only serve to improve the resistance of the products to water or chemicals and the mechanical strength, surface gloss and appearance of the products, but is also effective to prevent the occurrence of the fiber dirt, thereby preventing the deterioration of the products. It was also confirmed that placing in a kiln a container with only the alkali component put in it is effective.

Preferably, the alkali component should be impregnated in an amount of 0.01 to 0.2 kg/m$^2$ with respect to the internal surface area of the furnace or in an amount of 0.1 to 1.0 kg/m$^3$ with respect to the internal volume of the furnace. Preferably, the alkali component generating source should have a surface area in the range of 0.1 to 20 m$^2$/m$^2$ with respect to the internal surface area of the furnace.

The vaporization of the alkali component may be achieved by heating the furnace. For instance, heating schedule such as the rate of the temperature rise, heating time, and the rate of the temperature drop and cycle of heating may optionally be determined. More specifically, a slow heating rate of 50° to 150° C./hour after the furnace temperature has reached 600° C. is preferably applied so as to accelerate the vaporization of the alkali component. Preferably, the alkali component should be vaporized once to about ten times. It is also desired that the impregnation of the surface layer portion of the ceramic fiber body with the vaporized alkali component be applied to a fresh kiln. When the ceramic fibers of a furnace in normal operation are impregnated with alkali, attention should be fixed to soaking time and temperature rise rate. Especially when no alkali component is fed as experienced with a furnace used for refiring or any heating carried out not to vaporize the alkali component, it is required to feed the alkali component generating source into the furnace at certain intervals of time. Moreover, firing of glazed material is more effective and advantageous, since the vaporized alkali component is deposited onto the surface layer portion of the ceramic fiber body.

The present invention will now be explained in greater detail with reference to the following example and comparative example.

EXAMPLE AND COMPARATIVE EXAMPLE

Experimentation was carried out with such a kiln as illustrated in FIG. 1. The kiln 1 was lined with a ceramic fiber block. The material 3 to be fired was placed on a truck 2, which was then inserted into the kiln 1. A given amount of glaze was applied on the surface of the material 3.

Figure 2:
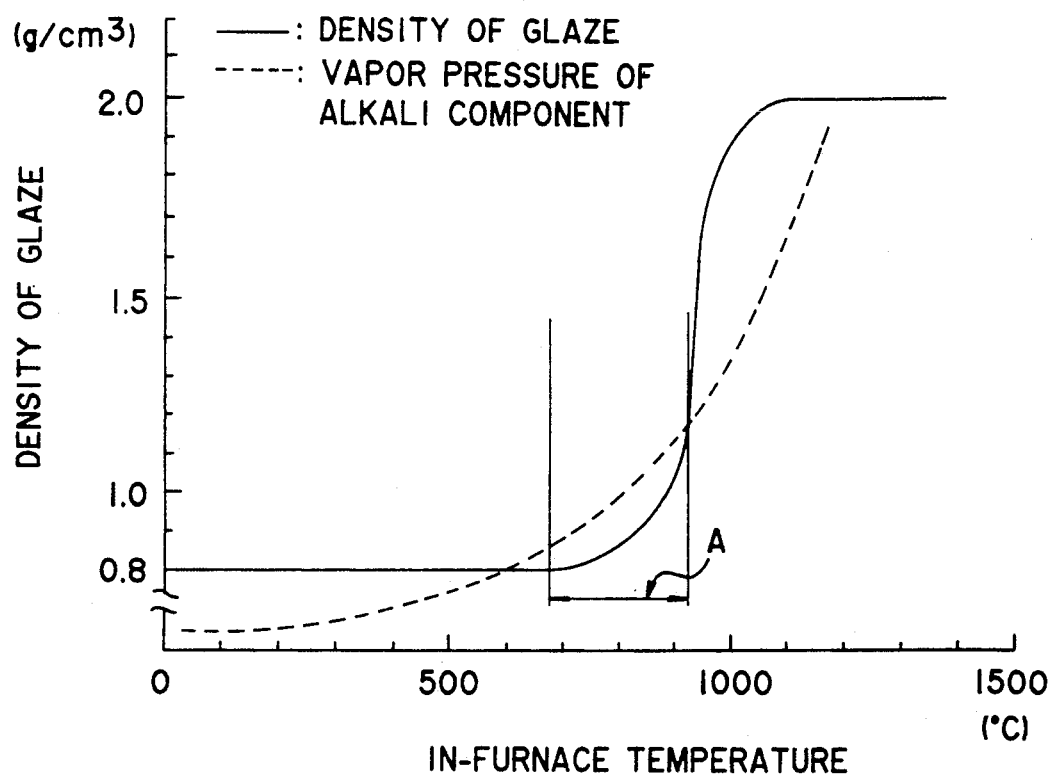
FIG. 2 is a graphical view for illustrating a preferable range of temperatures prevailing in the kiln during the surface treatment.
Figure 3A:
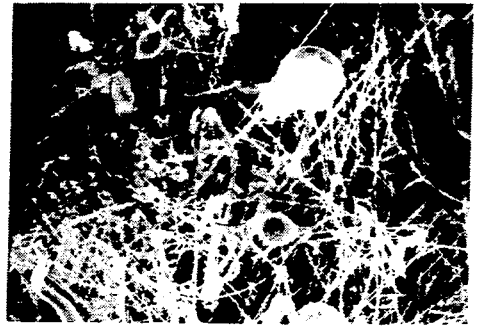
FIGS. 3A, 3B, 3C and 3D are photographs showing the morphologies of ceramic fibers on the surface layer portions of the ceramic fiber bodies, which were treated according to this invention and received no treatment at all for the purpose of comparison.
Figure 3B:
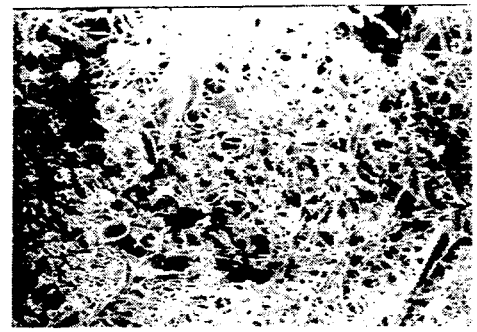
Figure 3C:
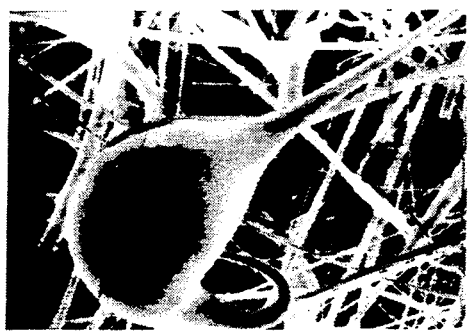
Figure 3D:
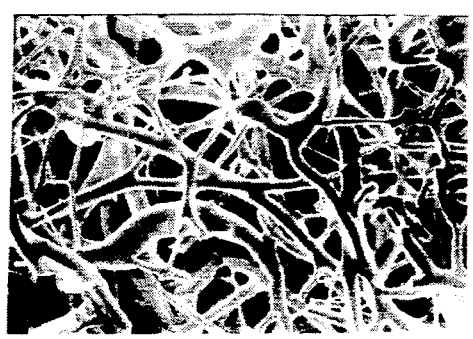

As shown in FIG. 2, the interior of the (single) kiln 1 was maintained at a temperature ranging from 650° C. to 950° C. shown by an arrow A for about 2 hours. The lower temperature limit was placed at 650° C. for the reason that at below 650° C., the vapor pressure of the alkali component in the glaze was so reduced in the kiln that the surface layer portion of the ceramic fiber block could not sufficiently be impregnated with the alkali vapor. The upper temperature limit, on the other hand, was placed at 950° C. for the reason that at higher than 950° C., the glaze on the surface of the material 3 was so rapidly densified, as shown in FIG. 2, that the glaze could not play such roles as already mentioned.

Set out below are the results of experimention. In the example according to this invention, the alkali component in the glaze applied on the above material was vaporized to impregnate the surface layer portion of the ceramic fiber block with the thus vaporized alkali component. In the comparative example, on the other hand, the surface layer portion of the ceramic fiber block received no treatment at all.

FIG. 3 shows the microstructures of the ceramic fibers of the ceramic fiber blocks which were treated by the vapor of the alkali component in the glaze (the example) and received no treatment at all (the comparative example).

In FIG. 3, (A) and (C) refer to the comparative example and (B) and (D) to the example according to this invention. A comparison of the example with the comparative example reveals that the ceramic fibers are discrete in the fiber structure of the comparative example, whereas they are organically interconnected with one another in the example according to this invention.

The results of experimentation indicates that the ceramic fibers of the comparative example produce a number of minuscular debris, which are in turn deposited onto the surface of the material to be fired, causing the fiber dirt. The ceramic fibers of the example according to this invention, however, produce no or little minuscular debris. In other words, the occurrence of the fiber dirt caused by the deposition of minuscular ceramic fiber debris onto the surface of the material to be fired is about 1/100 of that in the comparative example.

The results of chemical analysis of the surface layer portions of the ceramic fiber blocks are set out in Table 1.

TABLE 1

| | (by weight %) | |
|---|---|---|
| | $K_2O$ | $Na_2O$ |
| Example | 0.56 | 2.75 |
| Comp. Ex. | 0.04 | 0.11 |

From the results of analysis shown in Table 1, it is understood that the proportions of $K_2O$ and $Na_2O$, inter alia, $Na_2O$ are much higher in the example according to this invention than in the comparative example. This appears to be because the surface layer portion of the ceramic fiber block is so impregnated with the vapor of the alkali component in the glaze that the ceramic fibers can be interconnected and crosslinked with one another, thereby hardening the surface layer portion of the ceramic fiber body. The fiber debris is thus unlikely to fly apart in the kiln.

According to the inventive method for treating the surface of a ceramic fiber body, as detailed above, the alkali component generating source is first placed in a furnace. When the furnace is then heated, the alkali component is vaporized to impregnate the surface layer portion of the ceramic fiber body with the thus vaporized alkali component, whereby the fibers are interconnected with each other to harden the surface layer portion of the ceramic body. Thus, the present invention ensures that the fiber dirt is prevented from remaining on the product due to no occurrence of fiber debris, thereby improving the performance of the furnace. Especially when the present invention is applied to products such as sanitary wares and tableware, which are likely to be decreased in their commercial value by fiber debris, it is possible to prevent the deterioration of the products, carry out rapid firing and reduce fuel consumption.

We claim:

1. A method for treating a surface of the inner wall of a furnace, said inner wall being lined with ceramic fibers, the method comprising:

placing a source for generating an alkali component into a furnace, at least the inner wall of the furnace being lined with at least one ceramic fiber body and said source being a solution of a compound containing at lest one metal selected from the group consisting of an alkaline metal and an alkaline earth metal, and heating the interior of the furnace at a furnace heating rate, after the furnace temperature has reached 600° C., to increase the furnace temperature in an amount in the range of 50° to 150° C./hour so as to vaporize the source for generating the alkali component and to thereby impregnate a surface layer portion of the ceramic fiber body with the thus vaporized alkali component in an amount of 0.01 to 0.2 kg/m² with respect to the internal surface area of the furnace.

2. A method as claimed in claim 1, wherein said ceramic fiber body is in the form of a ceramic fiber board, block and/or blanket.

3. A method as claimed in claim 1 or 2, wherein each of said ceramic fibers is composed of 50% by weight of $Al_2O_3$, 35% by weight of $SiO_2$ and 15% by weight of $ZnO_2$.

4. A method as claimed in claim 1, wherein said solution is adjusted to a concentration of about 0.1 to 10% by weight with the addition of a water-soluble binder.

5. A method as claimed in claim 1, wherein said solution is put in a container.

6. A method as claimed in claim 1, wherein said alkali component is used in an amount of 0.1 to 1.0 kg/m³ with respect to the internal volume of the furnace.

7. A method as claimed in claim 1, wherein said source for generating an alkali component has a surface area in the range of 0.1 to 20 m²/m² with respect to the internal surface area of the furnace.

8. A method as claimed in claim 1, wherein said alkali component is vaporized by heating the furnace.

9. A method as claimed in claim 1, wherein the interior of the furnace is heated at a furnace heating rate, after the furnace temperature has reached 600° C., to increase the furnace temperature in an amount in the range of 50 to 150° C./hour so as to accelerate the vaporization of the alkali component in the furnace.

10. A method for treating a surface of the inner wall of a furnace, said inner wall being lined with ceramic fibers, the method comprising:

placing a source for generating an alkali component into a furnace adapted for firing a material into a product, at least the inner wall of the furnace being lined with at least one ceramic fiber body and said source for generating an alkali component is a solution of a compound containing an alkaline metal or an alkaline earth metal, and heating the interior of the furnace so as to vaporize the source for generating the alkali component and to thereby impregnate a surface layer portion of the ceramic fiber body with thus vaporized alkali component.

11. A method as claimed in claim 10, wherein heating is carried out one to ten times to vaporize the alkali component.

12. A method as claimed in claim 10, wherein said solution is adjusted to a concentration of about 0.1 to 10% by weight with the addition of a water-soluble binder.

13. A method as claimed in claims 10 or 12, wherein said solution is put in a container.

14. A method as claimed in claim 13, wherein said alkali component is impregnated in an amount of 0.01 to 0.2 kg/m² with respect to the internal surface area of the furnace.

* * * * *